UNITED STATES PATENT OFFICE.

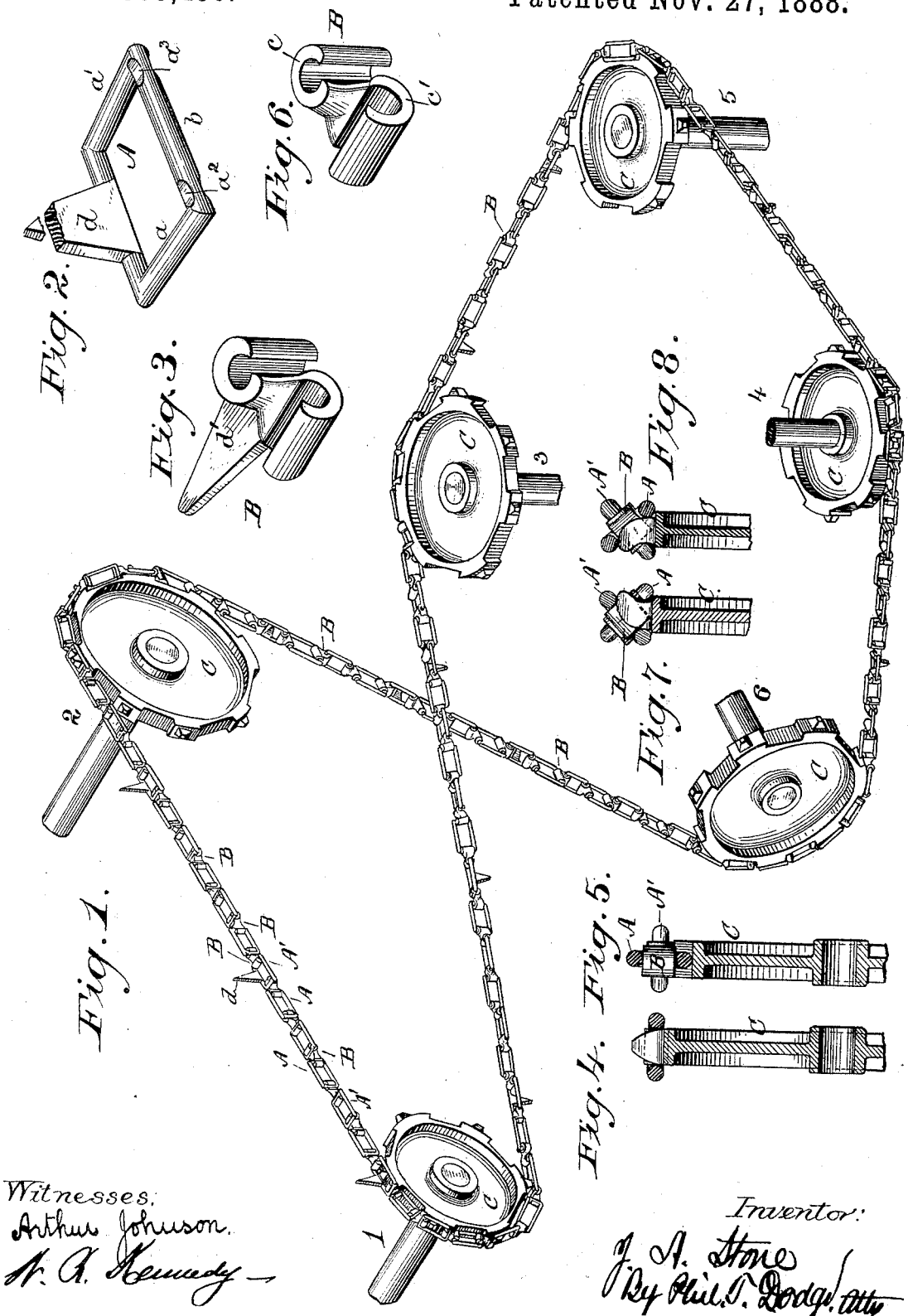

JOHN A. STONE, OF CHICAGO, ILLINOIS, ASSIGNOR TO WILLIAM DEERING & COMPANY, OF SAME PLACE.

DRIVE-CHAIN.

SPECIFICATION forming part of Letters Patent No. 393,490, dated November 27, 1888.

Application filed August 13, 1888. Serial No. 282,616. (No model.)

*To all whom it may concern:*

Be it known that I, JOHN A. STONE, a citizen of the United States, residing at Chicago, in the county of Cook and State of Illinois, have invented certain new and useful Improvements in Driving-Chains, of which the following is a specification, reference being had to the accompanying drawings, forming a part hereof.

My invention relates to that class of chains which are used upon wheels or pulleys for the purpose of transmitting power; and the object of the invention is primarily to provide a simple and inexpensive chain, which will travel smoothly around pulleys rotating in planes at right angles or at intermediate angles to each other.

To this end the invention consists, essentially, in a chain composed of rectangular links and intermediate couplings or connecting pieces by which the adjacent links are held in different positions, and so as to turn in different directions, in the manner hereinafter explained in detail.

In the accompanying drawings, Figure 1 is a perspective view showing a series of six pulleys in various positions connected by my improved chain. Fig. 2 is a perspective view of one of the links. Fig. 3 is a perspective view of one of the coupling-pieces with a carrying-finger thereon. Figs. 4 and 5 are cross-sections through one side of a sprocket-wheel and a chain thereon, showing the manner in which the chain seats itself upon the pulley. Fig. 6 is a perspective view of one of the coupling-pieces with the carrying-finger thereon. Figs. 7 and 8 are cross-sections through one side of pulleys having curved teeth, so that the chain-links may assume oblique positions thereon.

My chain consists of links A A' and intermediate couplings or connecting-pieces, B. The links A A' are alike in form, being indicated by different letters, because of the different positions in which they stand. Each link is in the form of an open rectangle—that is to say, it has two longitudinal parallel side bars, $b$, and two transverse end bars, $a\ a'$. These end bars are parallel with each other and at right angles to the side bars and are each of a circular form in cross-section. One of the side bars is provided near opposite ends with notches $a^3$ in the side faces, to permit the application of the coupling-pieces, and is hereinafter described. Each of the coupling-pieces B is cast or forged complete in one piece with two hook-like portions, $c$ and $c'$, lying at right angles to each other. Each of these hooks is adapted to receive and closely encircle one of the end bars or cross-bars of a link. The links are inserted by bringing the notches in their side bars, $b$, in line with the slot or open side of the hook, and then sliding the link sidewise to its place, after which it is turned around the end bar as an axis to its operative position, as shown in Fig. 1.

Owing to the form of the coupling-pieces—that is to say, owing to the fact that the two hooks $c$ and $c'$ lie in planes at right angles to each other—it follows that the link connected to one hook of the coupling will have its cross-bars in planes at right angles to those of the link attached to the other hook. In other words, the successive links of my chain will stand alternately in horizontal and in vertical position.

The hooks are adapted, as before mentioned, to closely encircle the cylindrical end bars of the links, so that the only play or movement between the two shall be a pivotal motion around the axis of the end bar as a center.

I construct the outside of the hooks as nearly as possible in the form of a cylinder, making the slot or opening as narrow as possible and making the outer surface concentric with the end bars of the links. This is done for the reason that my chain is frequently required to bend in both directions, or, in other words, to travel first with one surface and then with the other surface outward in passing over the successive pulleys. By giving the outside of the hooks a cylindrical form the pitch of the chain is maintained and the slackening of the chain prevented when it travels with the open side of the hooks next to the periphery of the wheels or pulleys.

While I prefer to construct the chain with the axis of the two hooks $c$ and $c'$ at right angles to each other, there may be a reasonable departure from this angle in either direction. A chain constructed on my plan may be applied to and will run freely around successive wheels or pulleys lying at right angles to each other or lying in planes oblique to each other.

In Fig. 1, C C represent a series of wheels or pulleys. Those designated 1 and 2 revolve on horizontal parallel axes. Nos. 3 and 5 revolve on vertical parallel axes and in the same horizontal plane. No. 4 revolves on a vertical axis, but in a plane lower than No. 5. No. 6 revolves on a horizontal axis at right angles to the axis of the other pulleys.

When the chain is required to travel over a pulley in a plane oblique to its predecessor, I prefer to form the teeth of the wheel with a curvature to the right or the left, as shown in Figs. 7 and 8, in order that the chain may engage and disengage with freedom; but in many cases the teeth may be shortened, so as to avoid the necessity for this lateral curvature.

When my chain is to be used as a conveyer in harvesting machinery or elsewhere, it may be provided at suitable points with carrying-fingers $d$, which may be formed either upon the links or upon the coupling-pieces. I prefer to form them upon the coupling-pieces, as shown in Fig. 3, for the reason that they may then be arranged to travel in planes parallel with the axes of the wheels, which is frequently desirable.

I am aware that chain-links have been provided with spheroidal end bars and links engaging the same to permit universal motion in the joint, and I am also aware that ordinary links of semicircular form at the ends have been connected by intermediate grooved blocks in which the adjacent links could turn edgewise in planes at right angles to each other. To such construction I lay no claim.

Having thus described my invention, what I claim is—

1. In a driving-chain, two links each having a straight cross-bar at the end, in combination with an intermediate coupling having two hooks, $c\ c'$, at approximately right angles to each other, said hooks closely embracing the cross bars of the respective links, as shown, whereby the links are permitted to turn upon their cross-bars as axes in planes at right angles to each other.

2. The coupling for chain links having the two hooks $c\ c'$ at substantially right angles to each other, as shown and described.

3. The coupling for chain-links, having the two hooks $c\ c'$ at an angle to each other, and the finger $d$, as shown and described.

JOHN A. STONE.

Witnesses:
J. F. STEWARD,
JAS. GILCHRIST.